United States Patent Office 3,763,277
Patented Oct. 2, 1973

3,763,277
PROCESS FOR THE PREPARATION OF INTER-POLYMERS OF POLY(ETHYLENE OXIDE)
Nan Shieh Chu, Hartsdale, N.Y., and Lloyd Henry Wartman, Westport, Conn., assignors to Union Carbide Corporation, New York, N.Y.
No Drawing. Original application Feb. 19, 1970, Ser. No. 12,866. Divided and this application July 1, 1971, Ser. No. 162,727
Int. Cl. C08g 43/02
U.S. Cl. 260—874                              3 Claims

ABSTRACT OF THE DISCLOSURE

Interpolymers of poly(ethylene oxide) and a vinyl monomer or mixtures of vinyl monomers prepared by combining poly(ethylene oxide), the vinyl monomer or mixtures of vinyl monomers in an aqueous medium and polymerizing the vinyl monomer or monomers in the presence of a redox catalyst system composed of a ferrous salt and an oxidizing agent. The products formed are castable into films having unique physical properties.

The present application is a division of Chu et al. application Ser. No. 12,866, filed Feb. 19, 1970.

BACKGROUND OF THE INVENTION

(1) Field of the invention

This invention relates to interpolymers of poly(ethylene oxide) with a variety of vinyl monomers, either alone or in combination, to the products producible therefrom, and to methods for preparing such interpolymers.

(2) Description of the prior art

High molecular weight polymers of ethylene oxide have been, of course, known for a long time. Indeed, they were described in a publication as early as 1933 (H. Staudinger and H. Lohmann, Ann. 505, 41 (1933). Commercial development of these products were delayed, however, by the fact that suitable catalysts providing for fast polymerization of ethylene oxide had not yet been prepared. Later research resulted in the development of new catalysts which afforded the industrial production of poly (ethylene oxide).

Copolymers of ethylene oxide have also been prepared using the same catalysts as those employed in making the homopolymer. To date, the only comonomers which are known to form interpolymers with ethylene oxide are other oxirane compounds, such as styrene oxide, propylene oxide or butylene oxide. The homopolymers of ethylene oxide, as well as its copolymers with oxirane monomers are made with various ionic catalysts well known to the art. Catalysts which generate free radicals, however, have been incapable of polymerizing these products.

SUMMARY OF THE INVENTION

It is therefore among one of the principal objectives of the invention to provide a new method of forming interpolymers containing ethylene oxide as one of the monomeric constituents, with a class of monomers which have heretofore not been copolymerized with ethylene oxide.

These are the vinyl monomers of the type,

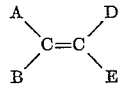

monomers which are capable of polymerizing by a free radical mechanism.

The aforementioned vinyl monomers are further divided into two classes, hydrophobic monomers and hydrophilic monomers. Hydrophobic monomers are vinyl compounds which tend to be incompatible with water. They are insoluble or only slightly soluble in aqueous media at all pH values at normal conditions of temperature and pressure. Hydrophilic monomers, on the other hand, are monomers which possess functional groups with an affinity for water. They are not necessarily soluble in aqueous systems at all pH values but any hydrophilic monomer will be soluble at some level of pH. For example, acrylic acid is very soluble at high pH values and less soluble at low pH, while vinyl pyridine is more soluble at low pH than at high pH. Thus, the invention contemplates within its scope interpolymers of ethylene oxide with either a hydrophobic monomer, or with a combination of hydrophilic monomers and, in a particularly preferred embodiment, with a combination of both hydrophobic and hydrophilic monomers incorporated onto the poly(ethylene oxide) at the same time.

Infrared spectra and other data suggest that the interpolymer product is a poly(vinyl monomer(s)) grafted to poly(ethylene oxide). The method used to form interpolymers of ethylene oxide with vinyl monomers involves the free-radical initiated polymerization of the vinyl monomer in the presence of a preformed polymer of ethylene oxide. In general, the poly(ethylene oxide) and the ferrous salt are dissolved in water and the vinyl monomer or mixture of monomers is added together with an oxidizing agent. It has been found that the presence of ferrous ions in the initiator is critical for the formation of the interpolymer. Indeed, redox initiating systems not containing ferrous ions have been found to yield little or no interpolymers.

Those interpolymers of poly(ethylene oxide) with either a hydrophobic vinyl monomer or with a combination of hydrophilic monomers have been castable into films having high yield strength and high elastic modulus. Those interpolymers of poly(ethylene oxide) with a combination of two vinyl monomers, one hydrophobic and the other hydrophilic, have been castable into water-swellable films capable of taking up from about 30 to 108 times their weight in water, and, at the same time, having the insoluble properties of the polymer. The water-swellable films behave as if cross links are present although only monofunctional monomers are used. This phenomenon will be discussed in more detail subsequently hereinbelow.

DESCRIPTION OF THE SPECIFIC EMBODIMENTS

The interpolymers of the invention are preparable with a variety of molecular weight grades of poly(ethylene oxide). A poly(ethylene oxide) of molecular weight 6000 (commercially available as Carbowax 6M from Union Carbide Corp.) forms an interpolymer as readily as a poly(ethylene oxide) of molecular weight 6,000,000 (commercially available as coagulant grade Polyox from Union Carbide Corp.). Thus, either lower or higher molecular weight grades will similarly form interpolymers.

As mentioned hereinabove, the method of the present invention is practiced with a class of vinyl monomers which have heretofore not been copolymerized with ethylene oxide. These vinyl monomers are further classified as either hydrophobic monomers or hydrophilic monomers. Illustrative examples of the hydrophobic monomers are N,N-dimethylaminoethyl methacrylate, styrene, methyl methacrylate, 2-methyl-5-vinyl pyridine, acrylonitrile and hydroxyethyl methacrylate, while illustrative examples of the hydrophilic monomers are acrylic acid and acrylamide. The above list of vinyl monomers merely names just a few of the vinyl monomers capable of forming interpolymers with poly(ethylene oxide), however, it is to be understood that any vinyl monomer capable of homopolymerizing of copolymerizing by a free-radical mechanism will form the interpolymer.

In carrying out the process of the invention, interpolymers of ethylene oxide and the various vinyl monomers are prepared by adding a mixture which consists of a vinyl monomer or mixture of monomers capable of polymerizing by a free-radical mechanism and an oxidizing agent into a solution of poly(ethylene oxide) and a ferrous salt under an inert atmosphere such as nitrogen. The ratio of vinyl monomers to poly(ethylene oxide) can be varied from 9/1 to 1/9 by weight. A more preferable range is from 1/1 to 3/7. Typical of the interpolymers which can be formed by the method are poly(ethylene oxide) with a hydrophobic monomer, such as styrene, or with a combination of hydrophilic monomers, such as acrylic acid and acrylamide, or with a combination of both hydrophobic and hydrophilic monomers, such as methyl methacrylate and acrylic acid, respectively. In the latter, combinations of the two monomers, one hydrophobic and the other hydrophilic, in the interpolymer, appear to impart the unique, water-swellable but insoluble properties of the polymer.

The behavior of these grafted polymers containing combinations of hydrophobic and hydrophilic comonomers is quite surprising. As mentioned, the graft copolymerization is carried out in an aqueous medium. Polymerization and grafting take place when the components are mixed and the product remains in solution. The products are quite different from the association complexes of the type described in U.S. Pat. 3,387,061. For example, according to the teaching of that patent, aqueous solutions of poly(acrylic acid) and poly(ethylene oxide) always form a viscous, insoluble precipitate when mixed. The products obtainable from the experiments of the present invention are water soluble on completion of the polymerization reaction. However, after casting into film from either directly from the reaction mixture or after partial neutralization to adjust the pH, the product is no longer water soluble. However, immersion of the film in water causes it to swell by the imbibition of water therein, but, the film does not go into solution. Indeed, the material behaves as if cross-links are present although only monofunctional monomers are used. This is surprising since no polyfunctional monomers are used in the polymerization and it is hypothesized that none could form in the casting process. It is theorized, although it is to be understood, that the invention is not to be so bound, that the hydrophobic monomer components in some way align themselves during casting in a manner such their close proximity prevents the water molecules from separating them. Thus, they act like primary valence cross-links. This is quite important since the cross-linkage supplies dimensional stability to the film without the expense and difficulties incurred in providing true cross-linkage. Hence, the films retain their integrity in water. When removed therefrom, they do not adhere to themselves and their original geometric shape remains unaltered. Applications for this type of film in areas where cellulose and similar materials are deficient in water absorption are immense, e.g. synthetic sponges, wiping cloths and the like.

The invention process may be carried out by first dissolving the poly(ethylene oxide) in water, then adding the polymerizable vinyl monomer and then adding the redox initiator, or instead, the poly(ethylene oxide) may be first dissolved in water, the initiator added and then the vinyl monomer or mixtures thereof added thereto.

Alternatively, water-swellable polymers can also be made with poly(ethylene oxide) grafted with hydrophobic monomers only, provided that some of the functional groups of the incorporated hydrophobic monomers can be subsequently changed to hydrophilic groups. Thus, a cationic water-swellable polymer was obtained when a mixture of styrene and 2-methyl-5-vinyl pyridine was incorporated onto poly(ethylene oxide) and the pyridine group was subsequently quaternized with dimethyl sulfate. The polymerization technique used is essentially the same as the others except that some emulsifying agent was used and that 2-methyl-5-vinyl pyridine and the major portion of styrene are added to the polymerization mixture immediately after the oxidizing agent. The polymer, when precipitated out by isopropanol, was found to imbibe 35 times of its weight of water when soaked in distilled water. The polymer can be cast into films either directly from the polymerization mixture or from a methanolic solution of the interpolymer.

Although films cast from poly(ethylene oxide) grafted with a combination of hydrophilic monomers such as acrylic acid and acrylamide remained water soluble, yet they showed a much higher strength and greater stiffness than the films made from the parent poly(ethylene oxide). The higher strength and greater stiffness of the interpolymer film is an obvious advantage in water-soluble film packaging applications, e.g., packaging of detergents and in seed type. Furthermore, a solution of the interpolymer can also be used as an anionic water treatment agent. Tests run on the performance of the polymer in this respect have shown that the interpolymer is as effective as Purifloc 21 (Dow Company's commercial anionic coagulant).

Insolubilization of the terpolymer in water can be achieved by baking the polymer film at 110° C. for 1 hour. After this baking, the polymer only swells in water. Soaking the terpolymer in a concentrated bi-valent metal such as calcium acetate also rendered them water insoluble. Apparently cross-links were formed in the present cases by these treatments. These films may also be used in the areas mentioned previously for the water-swellable films.

It has been found as a critical feature of the invention that the redox catalyst system must contain the presence of ferrous ions in order to form the interpolymer. The initiator comprises 0.05 to 1.0 mole percent, preferably 0.1 to 0.4 mole percent, based on the total vinyl monomer present, of a ferrous salt and an oxidizing agent, such as a persulfate or a water-soluble peroxide at a concentration of 0.05 to 1.0 mole percent, preferably 0.1 to 0.4 mole percent based on the total vinyl monomer present. Redox systems of other types, e.g. water-soluble salts of bisulfite and persulfate yielded little or no interpolymer.

The invention will be further described in conjunction with the following specific illustrative examples.

EXAMPLE 1

Into a 500 ml. four-neck round-bottom flask, fitted with a mechanical stirrer, an addition funnel and a nitrogen inlet and outlet tubes, 140 ml. of distilled water and 10 gms. of poly(ethylene oxide), molecular weight~200,000, were added. The poly(ethylene oxide) solution was stirred for a half hour under nitrogen before acidified with 5.4 ml. of a 0.4 N $H_2SO_4$ solution and the addition of a solution made with 0.075 gm. $Fe(NH_4)_2(SO_4)_2 \cdot 6H_2O$ and 10 ml. of distilled water. A separate solution containing 2 gms. of acrylic acid, 3 gms. of methyl methacrylate and 0.8 ml. of a solution made by diluting 2 ml. of a 30% $H_2O_2$ solution to 50 ml. with distilled water was added very slowly by means of an addition funnel at room temperature. The reaction was allowed to proceed for 3 hours and, at the end of the polymerization, 3 ml. of a 4% hydroquinone solution was added. The reaction was then neutralized with a 20% NaOH solution until a pH of 6.05 was reached. The very viscous and gel-like solution was further diluted with a 50–50 mixture of isopropanol and distilled water to a mixture with 3–5% solids content.

The casting was carried out on a glass plate at 35–40° C. The dry film was quite flexible even though most of the carboxyl groups had been converted to their Na-salt form. A 2 x 2 inch film at 0.004 inch thickness picked up 86 and 116 times of its weight of water in 5 and 20 minutes respectively and reached an equilibrium level of 128 times in 3 hours when soaked in a large excess (600 ml.) of distilled water. In 30 ml. distilled water, the same film imbibed about 50 times of its weight of water in 5 minutes and 86 times in 20 minutes. The results are tabulated in Table I.

EXAMPLE 2

The procedure of Example 1 was followed with the exception that the vinyl monomers used were 4 gms. of acrylic acid and 6 gms. of acrylonitrile. The polymer mixture was cast at a pH of 5.4 and 6.1. When casting, a 50–50 mixture of DMF* and distilled water was used to dilute the polymerization mixture to a castable 3–5% solution. The water swellability of the polymer film is summarized in Table I.

EXAMPLE 3

The procedure of Example 1 was followed with the exception that the vinyl monomers used were acrylic acid, 3 gms. hydroxyethyl methacrylate, 4 gms. and methyl methacrylate 3 gms. The polymer mixture was cast at pH of 4.2 and 5.5. At a thickness of 0.005 inch, a 2 x 2 inch film imbibed 16 times of its weight of water in 5 minutes and 20 times in 20 minutes when soaked in 30 ml. of distilled water. The results are summarized in Table 1.

EXAMPLE 4

The procedure of Example 1 was followed with the exception that the vinyl monomers used were acrylic acid, 2 gms., and methyl methacrylate, 7 gms. The polymer mixture was cast at pH of 5.1 and 6.7. The results are summarized in Table I.

EXAMPLE 5

Into the same apparatus used in Example 1, 10 gms. of poly(ethylene oxide), molecular weight ~600,000 were dissolved in 200 ml. distilled water under nitrogen. To this solution, 3.4 ml. of a 30 percent solution of Na-Lauryl sulfate, 2 gms. of styrene and 0.075 gm.

$$(Fe(NH_4)_2(SO_4)_2 \cdot 6H_2O)$$

(in 10 ml. distilled water) was added. After the mixture was well mixed, a solution of 0.06 gm. $(NH_4)_2S_2O_8$ dissolved in 10 ml. distilled water was added. This was followed by a rapid addition of a mixture of 5 gms. of styrene and 5 gms. af 2-methyl-5-vinyl pyridine. The polymerization was allowed to proceed for 3 hours and at the end of the reaction, 2 ml. of a 4% hydroquinone solution was added.

Dimethyl sulfate, 4.6 gms. was dropped into the polymerization mixture with stirring at room temperature. The mixture was left at room temperature for 16 hours before an excess of isopropanol was added. The polymer precipitated out was collected. The polymer was soluble in methanol but swelled only in distilled water. It imbibed 34 times of its weight of water when soaked in large excess of distilled water in 6 hours.

The above crude polymer after repeated extraction with distilled water and boiling benzene gave three fractions. Infra-red scan of the major fraction (60%), which was insoluble in both water and boiling benzene, showed the presence of all three components. This fact indicates that the major part of the product is the interpolymer.

EXAMPLE 6

The same procedure of Example 5 was followed except

TABLE I

| Example | Film thickness (inches) | pH of the mixture before casting | Imbibed water (factor of weight increase over original) | | | |
|---|---|---|---|---|---|---|
| | | | 2 mins. | 5 mins. | 20 mins. | 3 hrs. |
| 1 (in 600 ml. of distilled water) | 0.004 | 6.05 | | 86 | 116 | 128 |
| 1 (in 30 ml. of distilled water) | 0.004 | 6.05 | | 50 | 86 | |
| 2 (in 30 ml. of distilled water) | 0.004 | 5.4 | 18 | 26 | 30 | |
| Do | 0.005 | 6.1 | 33 | 54 | 64 | |
| 3 (in 30 ml. of distilled water) | 0.005 | 4.2 | 9 | 16 | 20 | |
| Do | 0.005 | 5.5 | 33 | 50 | Dissolved | |
| 4 (in 30 ml. of distilled water) | 0.004 | 5.1 | 4 | 5 | 5 | |
| Do | 0.003 | 6.7 | 24 | 36 | 41 | |

Reviewing the data of Table I, it can be seen that the swellability of the film is indicated to be controllable by the amount of distilled water used (note particularly Example 1). Moreover, it can be seen that pH has an effect on the swellability of the polymer film, that is, a higher pH yields higher amounts and faster rates of water imbibition (note particularly Examples 2 and 4). The integrity of the film appears also to be affected by the hydrophobic monomers used. When a hydrophobic monomer, hydroxyethyl methacrylate, is replaced by more hydrophobic monomer, methyl methacrylate (the hydroxyl group on the hydroxylethyl methacrylate imparts some water affinity) the water swellability of the polymer decreased but the integrity of the swollen film increased (note Examples 3 and 4). Infra-red scans of the dry films, after the films have been repeatedly soaked in fresh distilled water until all of the soluble components contained in the film were removed, still showed the presence of the ethylene oxide and the two water soluble monomers. The weight of the water insoluble film after the washing was about 61–75% of the original film, indicating that the major part of the product is the interpolymer.

*Dimethylformamide.

that poly(ethylene oxide) (10 gms., ~600,000 molecular weight) was added to the reaction mixture after the mixture of styrene and 2-methyl-5-vinyl pyridine was polymerized but before the addition of the dimethyl sulfate. The polymer, which precipitated out upon the addition of isopropanol, gave two fractions, the water soluble and the water insoluble fractions. Infra-red scans of the former showed it was mainly poly(ethylene oxide) containing little or none of the other two monomers, while the water insoluble fraction was poly(styrene-1,2-dimethyl-5-vinyl pyridium methyl sulfate) only. This again showed that product made in Example 5 is mainly the interpolymer.

EXAMPLES 7–15

Interpolymers of ethylene oxide with acrylamide, or with combinations of acrylic acid and acrylamide were prepared by a procedure substantially similar to that used in Example 1. Ten gms. of 600,000 molecular weight poly(ethylene oxide) were dissolved in 200 ml. of distilled water and 0.05 gm. $Fe(NH_4)_2SO_4 \cdot 6H_2O$ added. A separate solution containing the vinyl monomers and 0.04 gm. $(NH_4)_2S_2O_8$ (based on the total vinyl monomer) in 20 ml. of distilled water was prepared. This solution was added dropwise into the poly(ethylene oxide) solution at room temperature and the reaction allowed to proceed for 1.5 hours. The product was collected by pouring into methanol or isopropanol, and drying under vacuum. The interpolymers thus formed all gave infra-red scans different from those of mixtures of the homopolymers. Table II presents the yield and composition of the interpolymers formed wherever measured.

EXAMPLES 16–17

The same procedure given in Example 7 was used except that poly(ethylene oxide) was added to the polymerization mixture after a mixture of acrylic acid and acrylamide was polymerized. The compositions of the products isolated are shown in Table II. The percentages of ethylene oxide from two of these experiments (Examples 16 and 17) were much lower than those when acrylic acid and acrylamide were polymerized in the presence of poly(ethylene oxide) with ferrous salt and $(NH_4)_2S_2O_8$.

EXAMPLE 18

The same procedure as in Example 7 was used except that $Na_2S_2O_3$ (0.27 g.) was used instead of the ferrous salt. The product isolated contained much less of poly(ethylene oxide) and its infra-red scan was also different from that of the ferrous-catalyzed product. All bands in the spectrum of the ferrous-salt catalyzed product were very sharp, while the bands in the spectrum of the $$Na_2S_2O_3$$

catalyzed polymer were broad and had the same characteristic as the artificial mixture of poly(ethylene oxide) and copolymer of acrylic acid and acrylamide (e.g. product from Examples 16 and 17).

TABLE II

| Example No. | Monomer charged (grams)[1] | Yield, percent[2] | Interpolymer composition (weight percent) | | |
|---|---|---|---|---|---|
| | | | Acrylic acid[3] | Acrylamide[4] | Poly(ethylene oxide) |
| 7 | 10/10/0 | 45 | | 58.2 | 41.8 |
| 8 | 10/1/9 | 57.5 | 2.9 | 35.5 | 61.6 |
| 9 | 10/3/7 | | | | |
| 10 | 10/5/5 | 53.7 | 18.6 | 19.2 | 62.2 |
| 11 | 10/5/5 | 40 | 19.5 | 18.2 | 62.3 |
| 12 | 10/7/3 | | | | |
| 13 | 10/8/2 | 24.5 | 32.2 | 8.5 | 59.3 |
| 14 | 10/9/1 | 33 | 26.4 | 4.1 | 69.5 |
| 15 | 10/0/0 | None | | | |
| 16 | 10/1/9 | | 6.7 | 80.9 | 12.4 |
| 17 | 10/5/5 | 14 | 40.7 | 23.6 | 35.7 |
| 18 | 10/5/5 | 41.5 | 33.2 | 29.9 | 36.9 |

[1] Poly(ethylene oxide)/acrylic acid/acrylamide.
[2] By precipitation method. 85–95% yield was obtained when the polymerization mixture were dried directly under vacuum.
[3] From alkali titration with phenolphthaline as indicator.
[4] Calculated from nitrogen analysis.

The failure to obtain any yield in the sample of Example 15 in which no vinyl monomers were added, shows that the poly(ethylene oxide) by itself does not undergo any reactions with the redox catalyst system which renders it insoluble on addition of alcohol. However, a reduction of molecular weight occurred as shown by the fact that the reduced viscosity of a 0.1 g./dl. aqueous solution of the starting poly(ethylene oxide) was twice that of poly(ethylene oxide) after treatment with the redox catalyst.

The interpolymers, on the other hand, yield aqueous solutions with higher reduced viscosities at 0.1 g./dl. than the starting poly(ethylene oxide). For example, the interpolymer of Example 10 gave a reduced viscosity of 12.1 while the parent poly(ethylene oxide) had a reduced viscosity of only 5.52. The viscosity of the interpolymer solution was further increased by the addition of NaOH thereby forming the sodium salt of the polymerized acrylic acid units in the interpolymer. On neutralization with NaOH, the reduced viscosity increased to 87.3.

Films were cast directly from the polymerization mixtures of Examples 7–13. Transparent films about 0.001 inch thick were obtained by conventional means involving pouring the aqueous solution onto glass plates and drying in a forced-draft oven. Yield strength and elastic modulus data obtained respectively by ASTM methods D–1530 and D–1708 are given in Table III wherever measured along with data on poly(ethylene oxide) films prepared from the same polymer used to prepare the interpolymers.

TABLE III

| Example No. | PEO[1]/ Acrylic acid/ acrylamide | Yield strength (lbs./in.²) | Elastic modulus (lbs./in.²) |
|---|---|---|---|
| Poly(ethylene oxide) | | 1,110 | 34,500 |
| 9 | 10/3/7 | 2,440 | |
| 10 | 10/5/5 | 3,220 | 136,000 |
| 12 | 10/7/3 | 3,570 | 158,000 |

[1] Poly(ethylene oxide).

The higher strength and greater stiffness of the interpolymer films is an obvious advantage in water-soluble film packaging applications, e.g. in packaging of detergents and in seed type.

EXAMPLE 19

The same procedure as in Example 12 was used except that 0.02 gm. of a 30 percent $H_2O_2$ solution was used instead of $(NH_4)_2S_2O_8$. The formation of interpolymer was shown by the infra-red scan of the product.

What is claimed is:

1. A method of forming interpolymers of poly(ethylene oxide) and a vinyl monomer selected from the group consisting of hydrophobic vinyl monomers, hydrophilic vinyl monomers and mixtures thereof which comprises combining in an aqueous medium and under an inert atmosphere between about 90 and about 10 parts of poly(ethylene oxide) with between about 10 and about 90 parts of a polymerizable vinyl monomer selected from the group consisting of hydrophobic vinyl monomers, hydrophilic vinyl monomers and mixtures thereof in the presence of a polymerization initiator comprising between about 0.05 and about 1.0 mole percent of a ferrous ion producing salt based on the total vinyl monomer, and between about 0.05 and about 1.0 mole percent of an oxidizing reagent based on the total vinyl monomer.

2. A method of forming interpolymers of poly(ethylene oxide) and a vinyl monomer selected from the group consisting of hydrophobic vinyl monomers, hydrophilic vinyl monomers and mixtures thereof which comprises dissolving between about 90 and about 10 parts of poly(ethylene oxide) in an aqueous medium under an inert atmosphere, adding between about 10 and about 90 parts of a polymerizable vinyl monomer selected from the group consisting of hydrophobic vinyl monomers, hydrophilic vinyl monomers and mixtures thereof and polymerizing said vinyl monomer in the presence of a polymerization initiator comprising between about 0.05 and about 1.0 mole percent of ferrous salt based on the total vinyl monomer, and between about 0.05 and about 1.0 mole percent of oxidizing reagent based on the total vinyl monomer and recovering the resultingly formed interpolymer.

3. A method according to claim 2 wherein said poly(ethylene oxide) is present in amounts between about 70 and about 30 parts, said polymerizable vinyl monomer is present in amounts between about 30 and about 70 parts, said ferrous salt is present in amounts between about 0.1 and about 0.4 mole percent and said oxidizing agent is present in amounts between about 0.1 and about 0.4 mole percent.

References Cited

UNITED STATES PATENTS

| | | | |
|---|---|---|---|
| 3,546,321 | 12/1970 | Jabloner et al. | 260—87 X |
| 3,418,354 | 12/1968 | Wheeler | 260—874 X |
| 3,244,772 | 4/1966 | Von Bonin et al. | 260—874 X |
| 3,033,841 | 5/1962 | Germain | 260—874 X |

FOREIGN PATENTS

| | | | |
|---|---|---|---|
| 678,373 | 1/1964 | Canada | 260—874 |
| 922,457 | 4/1963 | Great Britain | 260—874 |

MURRAY TILLMAN, Primary Examiner

J. SEIBERT, Assistant Examiner

U.S. Cl. X.R.

210—54; 260—29.6 NR